July 20, 1948.　　　　D. G. BRAUER　　　　2,445,470
REFRIGERATING APPARATUS ASSEMBLED AND
REMOVED FROM CABINET AS A UNIT
Filed Sept. 4, 1944　　　　　　　　　　2 Sheets-Sheet 1
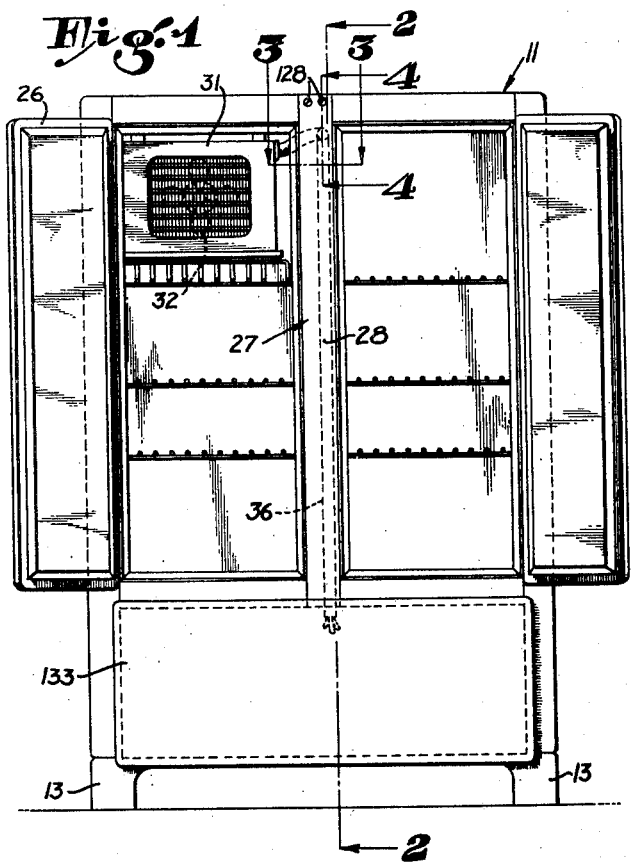
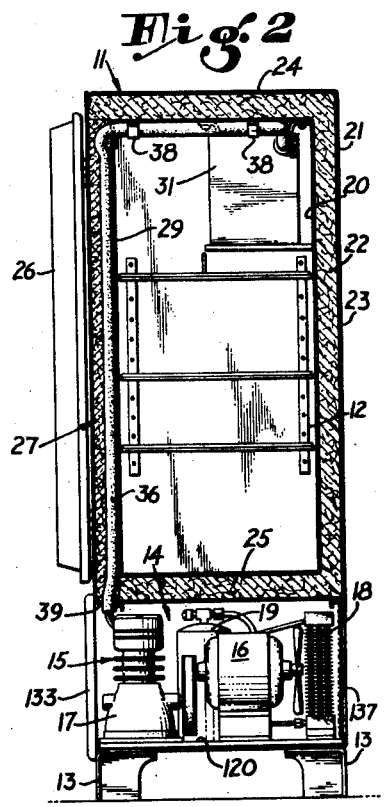
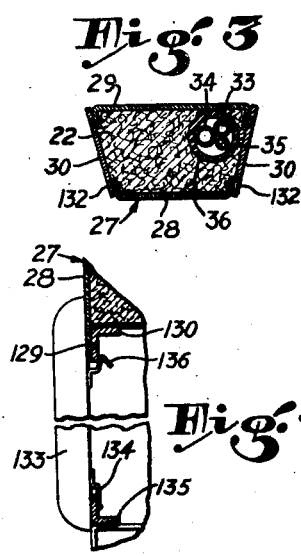
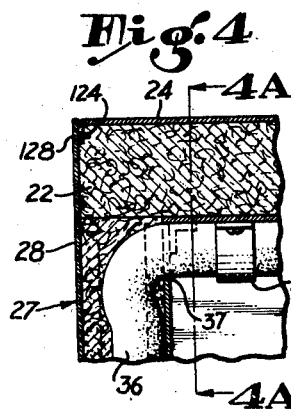
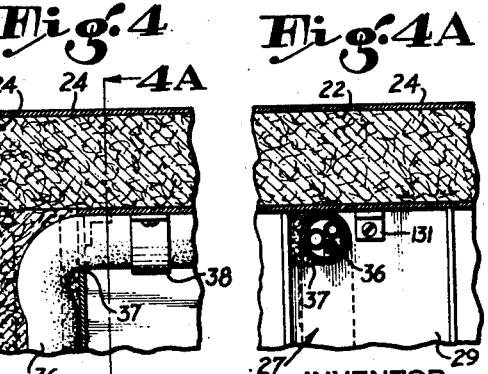
INVENTOR.
DAVID GEORGE BRAUER.
BY
ATTORNEY.

July 20, 1948.　　　　D. G. BRAUER　　　　2,445,470
REFRIGERATING APPARATUS ASSEMBLED AND
REMOVED FROM CABINET AS A UNIT
Filed Sept. 4, 1944　　　　2 Sheets-Sheet 2
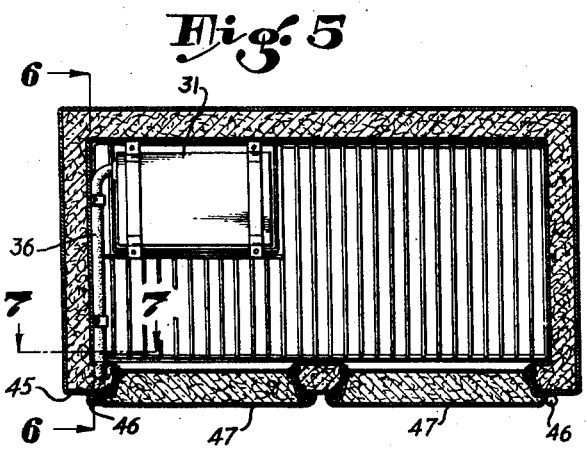
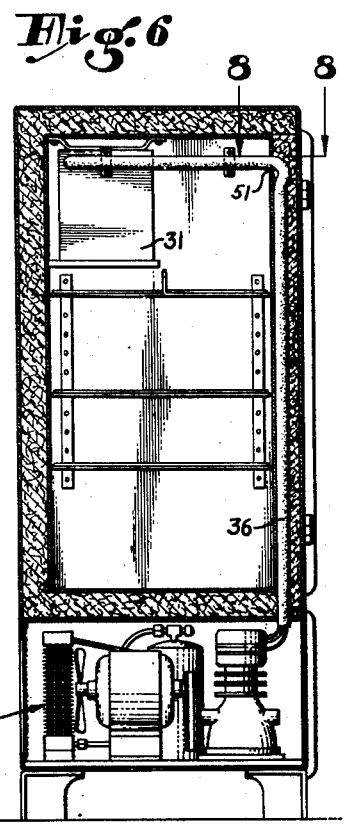
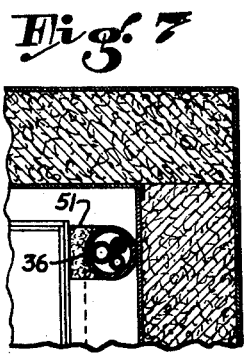
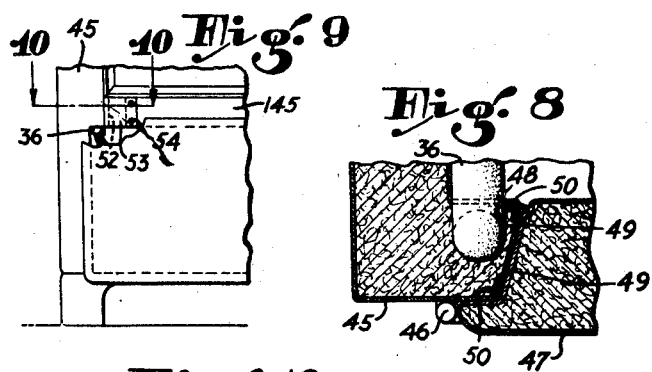
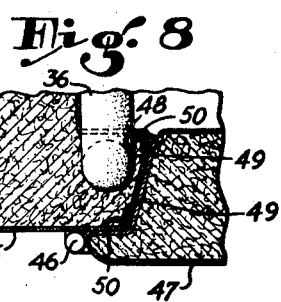
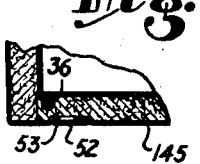
INVENTOR.
DAVID GEORGE BRAUER.
BY
ATTORNEY.

Patented July 20, 1948

2,445,470

UNITED STATES PATENT OFFICE 2,445,470

REFRIGERATING APPARATUS ASSEMBLED AND REMOVED FROM CABINET AS A UNIT

David George Brauer, West Los Angeles, Calif., assignor to Boypower Incorporated, Los Angeles, Calif., a corporation of California Application September 4, 1944, Serial No. 552,606

4 Claims. (Cl. 62—116)

1

This invention relates to refrigerators and more especially to a refrigerator cabinet construction and refrigeration plant adapted for ready installation in a refrigerator cabinet.

An object of the invention is to provide a simple, novel refrigerator construction wherein the refrigerating plant may be installed and removed as a unit without necessitating disconnecting any of the piping or parts.

Another object of the invention is to provide a self-contained sealed refrigerating plant adapted to be installed complete in a refrigerator cabinet without requiring connection of any piping or parts.

An additional object is to provide a refrigerator cabinet having a removable wall section which contains piping or conduits connecting the expansion coil unit within the cold compartment of the cabinet and a compressor unit located exteriorly of such compartment.

A further object is to provide a novel refrigerator cabinet construction having a wall portion provided with a removable section whereby piping or conduits connecting the expansion and compression units may be placed in the wall section, and readily removed therefrom.

An additional object is to provide a "reach-in" refrigerator having a removable and replaceable refrigerating plant wherein the piping and wiring for the expansion unit, located within the cabinet, are contained in part in a wall section that is accessible for removal of the expansion and compression units while the same are retained in hermetically sealed condition.

Other objects and advantages will appear and be brought out more fully in the following specification considered with reference to the accompanying drawings throughout which like parts are designated by like numerals.

In the drawings:

Figure 1 is an elevation view of a refrigerator embodying a form of my invention.

Figure 2 is a sectional view of the same taken along the line 2—2 of Figure 1.

Figure 3 is an enlarged fragmentary sectional view taken along the line 3—3 of Figure 1.

Figure 4 is an enlarged fragmentary sectional view taken along the line 4—4 of Figure 1.

Figure 4a is a sectional view taken along the line 4a—4a of Figure 4.

2

Figure 5 is a plan sectional view of a modified form of my invention.

Figure 6 is a sectional elevation taken along the line 6—6 of Figure 5.

Figure 7 is an enlarged fragmentary sectional view taken along the line 7—7 of Figure 5.

Figure 8 is an enlarged fragmentary sectional view taken along the line 8—8 of Figure 6.

Figure 9 is a fragmentary front elevation view of the embodiment of Figures 5 and 6.

Figure 10 is a fragmentary sectional view taken along the line 10—10 of Figure 9.

Figure 11 is a fragmentary view showing the mounting for the door of the refrigerating unit compartment.

Referring to the drawings more in detail I show a refrigerator cabinet 11 of generally conventional construction embodying a refrigerating compartment 12 suitably supported on legs 13, a space therebetween being provided and forming a compartment 14 for a refrigerating plant 15 which plant may include a motor 16, compressor 17, condensing coils 18, and a refrigerant receiver 19, secured to and supported on a base 120, such that refrigerating plant 15 may be inserted in compartment 14 and removed therefrom as a unit. Compartment 12 is formed of an insulated wall structure wherein inner and outer panels 20 and 21 retain insulating material 22 of any suitable character, such as fabric, fibre, wool or mineral material of compressible or deformable character, the compartment having integral back, top and bottom walls 23, 24, and 25 respectively, and a pair of forwardly opening insulated doors 26 hinged at 126 at the sides thereof.

A center vertical door stile 27 is provided, and comprises a front panel 28 which is secured by screws 128 to a down turned flange 124 of panel 20, and by screws 129 to an angle member 130 under bottom wall 25. (Figure 11.) Stile 27 has an inner panel 29 secured as by a bracket 131 to the inner panel 20 of top 24, and a pair of side panels 30 secured by screws 132 or otherwise to panels 28 and 29.

A removable door 133 is secured at the front of compartment 14 to provide access thereto, as by brackets 134 engaging an angle member 135 on the cabinet frame, and one or more spring latches 136 engaging angle member 130. The rear wall of compartment 14 is open to admit air thereto, and a grill 137 covers the opening.

An expansion coil unit 31 is suitably secured in an upper portion of cabinet 20, and may be provided with a motor driven fan 32 if desired. A pair of pipes 33 and 34 are provided, being high pressure and low pressure pipes respectively, and connect refrigerating unit 15 and expansion unit 31, and are hermetically sealed thereto. Fan 32, if provided, is powered by electrical conductors, wires 35 connected to the same source of power as motor 16, and adapted to be operable therewith, either intermittently, or continuously if preferred. Pipes 33 and 34 and wires 35 are preferably contained in a protective shield or conduit 36 which extends between units 15 and 31, and may be of any suitable material, however preferably having heat insulating characteristics.

The vertically extending portion of conduit 36 and the contained pipes and wires is positioned in the interior of stile 27, panel 29 having a suitable side opening 37 therein, near the top thereof, for the laterally extending portion of the conduit, which may be secured as by brackets 38 to the inner panel of top wall 24. A similar opening 39 is provided in the lower end of stile 27 for the end portion of conduit 36 as it enters compartment 14. Conduit 36 and the contained piping and wiring can thus be placed in and removed from stile 27 by removing panel 30 or loosening the upper portion thereof, and removing panel 28, it being clear that insulating material 22 is compressible or deformable, or loosely packed to permit the conduit to be placed within the stile.

It should be obvious from the foregoing description that the compression unit 15 and the expansion unit 31 are readily removable from the refrigerator and cabinet, and that conduit 36, containing the piping and wiring, may, by the removing of front panel 28, be removed from stile 27 and the refrigerator, the piping being retained hermetically sealed to the units, and the electrical wiring being retained intact, and the entire refrigerating system and assembly be removed for adjustments or repairs, and replaced by a similar unit, either new or serviced, and in operating condition.

It is well-known that refrigerating systems of the character shown require periodic servicing and repairs of a nature which can be more conveniently and expeditiously done in a shop than in the place of location, and that by the ready removal of the refrigerating system intact, as described, this servicing and repairing can be more effectively accomplished, and a new, permanent or a temporary, replacement unit may be provided in place of the unit removed, and the refrigerator is thus retained in completely serviceable condition except for the few minutes needed for the change.

In Figures 5 to 10 I show a modified form of my invention. In these figures the cabinet and refrigerating units are susbtantially similar to those of Figures 1 to 4a, however, in the modified form I show a door stile 45 on which are secured hinges 46 for one of the doors 47. Stile 45 is provided with a door jamb plate 48 which may be secured to flange portions 49 of stile 45 by a plurality of screws 50. The conduit 36 may thus be placed within stile 45 when plate 48 is removed, there being a cut-out portion 51 in wall 20 to permit conduit 36 to extend therethrough and laterally to expansion unit 31.

In order to provide means for removal of the conduit 36 through sill 145, a slot 52 is formed therein adjacent stile 45 and normally covered by a plate 53 suitably secured to the panel as by screws 54. It will thus be clear that in the form of my invention, shown in Figures 5 to 10, compressor unit 15 and the expansion unit 31, together with conduit 36 and the contained piping and wiring, may be removed and replaced as an integral unit in substantially the same manner as that of Figures 1 to 4a.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims, so as to embrace any and all equivalent devices and systems.

Having thus described my invention, what I claim and desire to secure by Letters Patent is:

1. In a refrigerator, a cabinet forming a refrigerating compartment having insulated walls and a side opening door and a vertical paneled door stile having an interior chamber packed with heat insulation material, a compressor unit mounted below said compartment, an expansion coil unit in an upper portion of said compartment, a plurality of pipes connecting said units and the vertical portion thereof being disposed within said door stile and embedded in said insulating material, said door stile having a detachable panel and said pipes and units being integrally removable from said stile and the refrigerator.

2. In a refrigerator, a cabinet forming a refrigerating compartment having insulated walls, a side opening door and a vertical door stile having an interior chamber packed with insulating material, one side of said stile comprising a panel, a compressor unit mounted below said compartment, an expansion coil unit in an upper portion of said compartment, a plurality of pipes connecting said units and the vertical portion thereof being disposed within said door stile, said insulating material being pressed inwardly for reception of said pipes, said door stile having a detachable side panel and said pipes and units being integrally removable from said stile and the refrigerator without disconnecting any of said pipes.

3. In a refrigerator, a cabinet forming a refrigerating compartment having insulated walls, a pair of side opening doors and a vertical immovable paneled door stile, a compressor unit mounted below said compartment, an expansion coil unit in an upper portion of said compartment, said stile providing an opening on one side thereof greater in width than the width of said expansion coil unit, a plurality of pipes connecting said units and the vertical portion thereof being disposed within said door stile and extending laterally into said compartment adjacent the upper end of said stile, said door stile having a side panel over said pipes between said stile and an edge of one of said doors, said side panel being removable by lateral disengagement without disturbance of front or back panels of said stile, said units and pipes being integrally removable from the refrigerator when said panel is removed.

4. In a refrigerator, a cabinet forming a refrigerating compartment having insulated walls, a side opening door and a vertical door stile comprising four panels in a hollow quadrilateral arrangement filled with heat insulating material, an interior panel of said stile being removable and a recess therebehind formed by a depression in the insulating material, a compressor unit mounted below said compartment, an expansion coil unit in an upper portion of said compartment, a conduit containing pipes and wires connecting said units and the vertical portion thereof being disposed in said door stile recess, and adapted to be removed therefrom when said panel is removed, and said conduit and units adapted to be integrally removed from the refrigerator.

DAVID GEORGE BRAUER.

REFERENCES CITED

The following references are of record in the file of this patent:

UNITED STATES PATENTS

| Number | Name | Date |
|---|---|---|
| 1,791,503 | Hull | Feb. 10, 1931 |
| 1,797,225 | Brueckner | Mar. 24, 1931 |
| 1,825,731 | Hull | Oct. 6, 1931 |
| 2,010,924 | McCormack | Aug. 13, 1935 |
| 2,012,494 | Blood | Aug. 27, 1935 |
| 2,133,965 | McCloy | Oct. 25, 1938 |
| 2,135,091 | Newill | Nov. 1, 1938 |
| 2,137,165 | Knight | Nov. 15, 1938 |
| 2,270,407 | Blood | Jan. 20, 1942 |